June 12, 1962 A. L. W. WILLIAMS ETAL 3,039,007
PORTABLE TURBO GENERATOR
Filed Aug. 17, 1959 2 Sheets-Sheet 1

INVENTORS
ALFRED L.W. WILLIAMS
DAVID P. EASTMAN
BY
*Eber J. Hyde*
ATTORNEY

United States Patent Office 3,039,007
Patented June 12, 1962

3,039,007
PORTABLE TURBO GENERATOR
Alfred L. W. Williams, Cleveland, and David P. Eastman, Novelty, Ohio, assignors to Clevite Corporation, Cleveland, Ohio, a corporation of Ohio
Filed Aug. 17, 1959, Ser. No. 834,056
9 Claims. (Cl. 290—52)

The invention relates to a portable fluid driven turbine and more particularly to a turbo generator for generating electric current adapted to be employed in combination with a detachable fluid fuel cartridge.

The failure of battery power when used for starting automobile engines, particularly in harsh climates or when operating under difficult conditions, is very well known. Under certain disadvantageous conditions such as occur frequently in the Arctic region, conventional battery power failures are commonplace and the consequences thereof in such regions are often disastrous.

One object of this invention is to provide a turbo generator which is unaffected by greatly varying temperatures and yet incorporates the features essential for a workable substitute as a starting power supply unit. The turbo generator can be speedily attached for operation in motor vehicles by merely connecting the same across the starter of the engine and the fuel cartridge may then be actuated as required. The unit can be left connected to the starter in this manner and the battery will not discharge through the generating portion of the device when connected to a suitable rectifier and conversely the unit will not discharge through the battery since the starting switch conventionally remains open.

It is another object of this invention to provide a small and compact turbo generator of comparative light weight, readily transportable and adapted to supply a starting current for such units as aircraft engines, motors of pleasure crafts, and similar devices. The invention can be utilized in connection with a detachable fluid fuel cartridge which may be speedily attached, and similarly, connection to the external electric circuit can be quickly performed.

Another object of this invention is to provide a turbo generator which is smooth in outside appearance and not encumbered with switches of any kind and wherein substantially all mechanical components are within the housing, thus improving the safety aspect and simplicity of the device.

Another object of this invention is to provide a turbo generator, in combination, with a suitable rectifier supplying a direct current. The generator itself provides an alternating current and the high r.p.m. of the device, up to 40,000 r.p.m., permits usage of a small and light permanent magnet, as a result thereof this invention makes a compact and portable unit feasible, the current generating section thereof constituting only about 1/10% the size and weight of a conventional direct-current generator. The rate of rotation of the unit is regulated by a novel speed regulating means.

Further, and more specific objects of the present invention will in part be obvious, and in part will be specifically pointed out in the following description of the invention. For a better understanding of the invention reference may be had to the accompanying drawings wherein.

Figure 1:
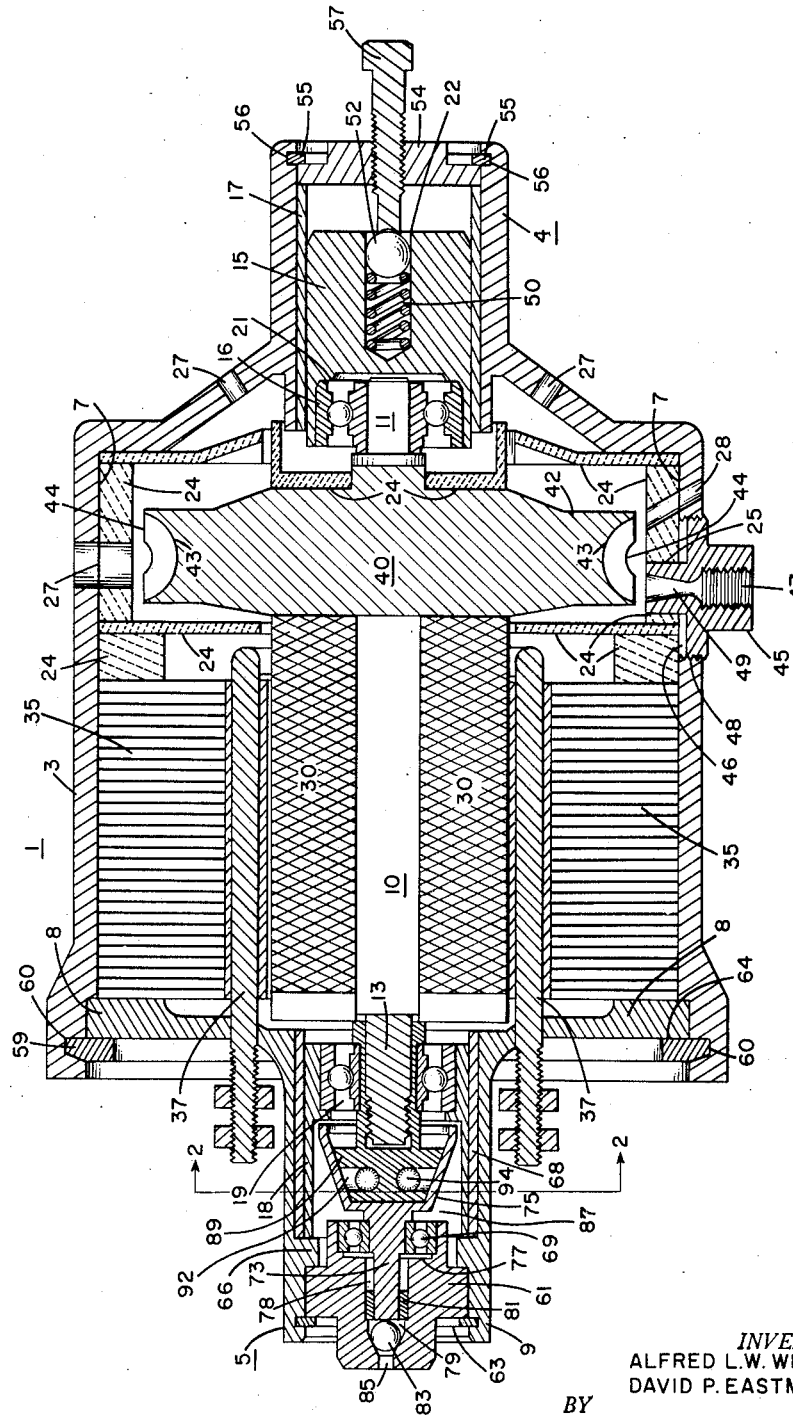
FIGURE 1 is a longitudinal section showing the main embodiment of this invention.

Briefly, the invention comprises a hollow housing encasing the turbo generator, a driven shaft, and a turbine wheel axially disposed about the shaft for rotary movement. A thermal shield means surrounds some portions of the wheel. A rotor is adapted to rotate in unison with the turbine wheel and a stator circumferentially surrounds the rotor and in combination therewith is adapted to generate current. A plurality of turbine buckets are formed at the peripheral limits of the wheel to operably receive a torque producing fluid and fluid inlet and outlet means is adjacently disposed with respect to the wheel buckets. The shaft has axial freedom with respect to the inlet means. A first substantially cylindrical bushing is slidably disposed within the housing and is in axial alignment with one end of the shaft and the bushing has on one side a small, and at opposite end a large, substantially cylindrical cavity. A bearing element is peripherally rigidly disposed within the large cylindrical cavity adjacent to the wheel to journal the shaft therein, and a substantially hollow cylindrical bushing is axially and slidably positioned within the housing and arranged coaxially with the opposite end of the shaft. Another bearing element which has a central opening and receives the shaft therethrough is peripherally rigidly disposed within the hollow bushing adjacent to the rotor. A bias spring is partially positioned within the small cavity, and is in pressure engagement with the first cylindrical bushing urging the turbine wheel to remain substantially in its initial position. One end of a cup member provides a conical housing. A thrust member is concentrically and rigidly mounted about the shaft with one end thereof projecting into and registering with the conical housing.

This end of the thrust member provides a cone-like flange, including radially arranged channels outwardly open at the location where the peripheral surface thereof abuts against the conical housing. A ball is loosely positioned within each of these channels and the conical housing restricts the path of free outward movement of the balls. A thrust bearing means is provided to support the shaft rotatably at each end.

Referring now to the drawings, the invention comprises a housing 1 made out of cast aluminum and divided into three sections. The middle housing section 3 carries a prime mover or turbine wheel 40 including a shaft 10 rotatably supporting the wheel, and adjacent thereto a current generator combination is operatively positioned; which includes a rotor 30 and stator 35. The housing end portions 4 and 5, respectively, contain supporting means for the shaft adapted to provide axial freedom of movement for the shaft mounted prime mover and members of the generator combination.

The shaft 10 carries the wheel 40 coaxially substantially near one end 11 thereof. The wheel 40 is preferably made out of a strong suitable material such as stainless steel and is formed by an annular disk 42 circumferentially surrounded by a plurality of buckets 44 either secured thereto by means of a suitable ring or integral therewith, the buckets 44 or responsive means being similar to those of a conventional turbine runner. The shaft at end 11 is supported by means of a bearing support bushing 15, slidably disposed within the end housing 4 integrally formed with the housing 3, and more particularly journalled in a suitable bearing element 16 carried by the bushing 15. The opposite end 13 of the shaft 10 is supported by a bearing support bushing 18 contained in the housing section 5 carrying a suitable bearing element 19 to journal the shaft 10 therein. Adjacent to the wheel 40 a permanent magnet or rotor 30 is rigidly mounted about the shaft so that the wheel and the permanent magnet may be rotatably driven in unison by the shaft. The rotor 30 is circumferentially surrounded by a stator 35 comprising conventional laminated steel armature plates, and a small peripheral gap is left between the rotor 30 and the stator 35. A plurality of conductors, a single conductor 37 is shown in the drawing, are positioned around the inner periphery of the stator steel core 35 in a conventional manner so as to be alternately coupled and uncoupled by the flux from the rotating field. Hence in combination, the arrangement provides for a relative motion between the conductor and the permanent magnet, and as a result thereof a voltage is induced in the conductors, in the conventional manner. The conductors 37 are comprised of a copper bar suitably coated, and one end thereof extends through the housing 5 for suitable connection with an external circuit, not shown.

The middle or main section 3 of the cylindrical housing 1 and more particularly the inner cylindrical wall 7 of the section which circumferentially surrounds the turbine wheel is covered by a flame shield 24 comprised of a graphitic insulating material. Other internal surfaces adjacent to the wheel are similarly covered and protected wherever practical. As shown in FIGURE 1, the axial end portions of the stator are suitably covered by the thermo-insulation 24, and the shielding is extended toward the axial center of the device.

Further, the flame shield is suitably provided with a plurality of apertures to accommodate the transition of the motive fluid. One such aperture is located at 25 which is coaxial with an annular internally threaded aperture 46 to receive an inlet nozzle member 45. Member 45 is substantially annular and an intermediate flanged portion 48 is peripherally threaded for seating the member into the housing 3. A central through bore of uneven diameter comprises a threaded section 47 and a jet section 49. The threaded section 47 is provided to receive a fuel supply conduit or a detachable fuel cartridge, neither of the two being shown on the drawings. Thus, the fluid energy is introduced through the threaded portion 47 into the jet 49, the latter being oppositely positioned from the buckets 44, the location being further determined by the axial movability of the wheel so that the buckets and the inlet nozzles are initially in an efficient cooperating position and after the wheel has reached a predetermined r.p.m. the wheel is progressively longitudinally displaced and the location of the inlet jet relative to the buckets is such that portions of the fluid streams are not effectively impinging against the buckets 44.

The nozzle 45 is replaceable so that the same can be simply interchanged with a nozzle having other jet characteristics to suit a different type of fuel.

Other apertures in the flame shield and the housing accommodate the fluid exit. Several fluid outlets are shown at 27, these outlets functioning primarily to take care of spillage, whereas the main body of fluid energy is moved out by means of an outlet bore means 28 cutting across the housing 3 and flame shield 24, the axial center thereof describing an angle which is in cooperating position with the buckets 44 and more particularly with radial depressions 43, so that an introduction of gas into the buckets causes the gas to travel circumferentially therein and to continue its travel again outward through the outlet means 28.

The end section 4 of the housing forms a hollow cylindrical portion and a narrow cylindrical sleeve 17 is rigidly disposed therein providing a smooth inside surface suitable for a sliding fit. The sleeve is inserted with a press fit and is made out of suitable conventional rigid material, such as copper or copper alloy.

The bearing support bushing 15 is generally cylindrical and may be made out of copper, or an alloy thereof, and forms a radial bore to retain the bearing element 16 and oppositely therefrom the bushing provides a small cavity 22 substantially in axial alignment with the shaft 10, to receive a compression spring 50 and a thrust bearing 52, the former being in pressure engagement with the latter. This pressure is adjustable by a screw stem 57 protruding from the outside through an end disk 54 and engaging the thrust bearing 52 thereabout.

To provide convenient access to the bearing 16 within the hollow housing 4, the side wall is comprised of a removable end disk 54 which fits snugly into the housing portion 4 and is retained on one side therein by a snap ring 55 fitting into a radial groove 56 provided therefor and radial portions thereof abut against the end disk. On the opposite side the latter is retained by the abutting sleeve 17.

The other end part 5 of the husing 1 is not integral with the housing, but is shown as having a flanged part 8 providing abutting means with the general housing and a cylindrical portion 9 which carries the bearing 19 and cooperating components including a speed limiting combination 87 regulating the rate of rotation of the device. End portion 5 provides similar simple access means as housing end 4. That is to say, a snap ring 59 is resiliently disposed into a radial groove 60 provided therefor to rigidly retain a bearing support bushing 61, one end thereof forming an end disk 63. The groove 60 is located near the right end of the end housing 5, as shown in the drawing, and the snap ring 59 is radially split to provide for radial contraction when the ring is to be taken out. The peripheral rim portion of the snap ring fits tightly into the radial groove. Inwardly projecting portion 64 of the snap ring 59 provides a retaining shoulder abutting against flanged part 8. All other snap rings heretofore and hereinafter to be mentioned are similarly arranged.

The housing section 5 provides a radial abutting shoulder 66 to retain the bushing 61 with respect to the snap ring. The bearing support bushing 61 has three stepped central bores 77, 78 and 79 which are substantially coaxially arranged with respect to the shaft 10. Facing inwardly, the bushing provides a radial recess or bore 77 to rigidly receive a bearing element 69 wherein a stem 73 of a cup member 75 is journalled. The intermediate bore portion 78 receives the stem 73 to rotatably support same in a cylindrical sleeve bushing 81 rigidly retained with a press fit in bore section 78. The outermost bore 79 is substantially cone shaped to rotatably receive a radial thrust ball bearing element 83, and a narrow bore channel 85 is extended therefrom to the end of the bushing member 61. Within housing 5, a narrow hollow cylindrical sleeve 68 is rigidly disposed. The sleeve is constructed to allow the bearing support bushing 18 a limited amount of axial freedom. An alternative is to construct the walls of the housing member 5 in such a manner so as to provide a substantially similar internal wall surface so that bushing 18 can be slidably moved therein, thus eliminating the requirement for a sleeve.

Carried within the aforedescribed housing 5 is the speed limiting combination 87 employed in connection with the major elements of the device, to control the rate of rotation. This unit is shown in detail in FIGURE 3. The unit is made operative by providing the cup member 75, which forms on one end an elongated central stem portion 73, and oppositely therefrom a hollow cone-like housing registers with a conical head 89 of a thrust member 90. The stem 73 of the cup member 75 protrudes as aforestated through bearing 69 and is further in axial contact with thrust bearing 83. The cone-like housing 76 extends inwardly, and is open to receive the conical head 89 of the thrust member. The taper or slope of the cone housing 76 corresponds in proportion with that of the conical head 89. The configuration of the conical head 89 is similar to that of a frustum of a circular cone and if an imaginary line is projected to complete the cone the angle between the two adjacent lines, that is the included angle, should not be greater than 15°.

Figure 2:
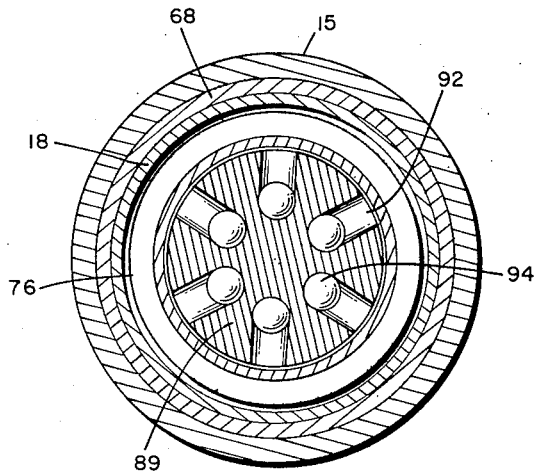
FIGURE 2 is a cross section taken through the speed limiting section of the device as shown in FIGURE 1 and designated by line 2—2 in FIGURE 1.
Figure 3:
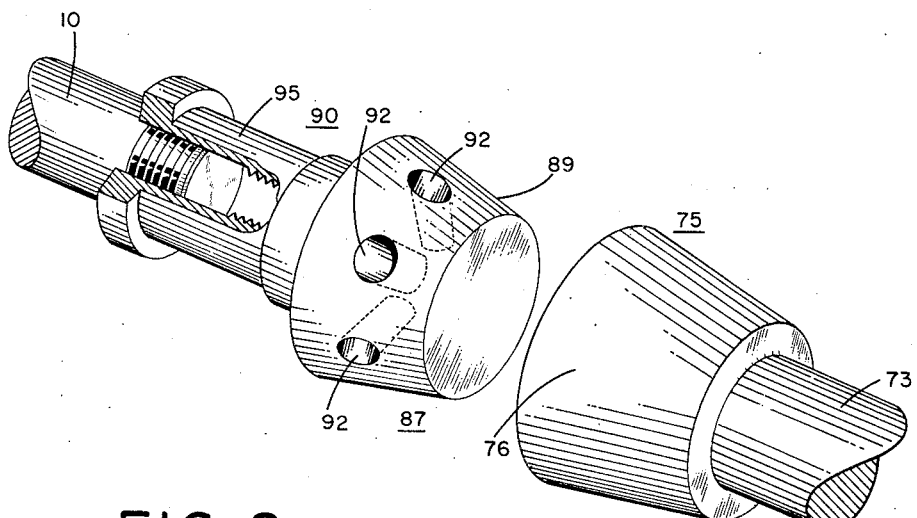
FIGURE 3 is a perspective view of the thrust and cup member shown separately for further clarification.

The conical head 89 of the thrust member 90 has six radially arranged and outwardly open circular channels 92 to loosely receive a ball 94 within each of such channels. As shown in detail in FIGURE 2, six balls are radially arrayed. In this manner the balls are structurally separated, and the freedom of motion is restricted to the path as defined by the channels, hence the balls are prevented to rotate individually. The balls rotate in unison with the shaft by reason of the threaded connection with the shaft as shown in FIGURE 3, and hereafter further described. After the shaft proceeds to rotate and subsequently reaches a predetermined r.p.m., the balls by means of the inherent centrifugal force will begin to rise along the outward path of the channels and move until they abut against the inner wall of the conical housing member. Resultant vector forces cause a simultaneous force upon the walls of the channel 92 as well as upon the inner wall of the conical housing 76. This causes the balls to force the thrust member 90 toward the axial center of the device. The opposite end of the thrust member 90 forms hollow cylindrical sleeve 95, the outside cylindrical wall thereof being rotatably supported by the bearing element 19, and sleeve 95 is adapted to threadedly receive the end portion 13 of the shaft 10 and to provide a rigid connection therewith.

Again, in operation a motive fluid is introduced through the inlet nozzle 45 and the path defined by the latter leads the motive or working fluid into the buckets 44 of the wheel 40 and causes a torque upon the wheel, the fluid then escapes through one of the outlet means 27 and 28. The rotation of the turbine wheel causes a voltage to be induced by the rotor 30 stator 35 combination. The thrust 90 and cup member 75 follow in unison the shaft 10 and upon reaching a predetermined rate of rotation the balls 94 start to move outwardly and the centrifugal forces developed by the rotation urge the balls against the thrust member. The speed of the rotating components increases rapidly and within a fraction of a minute 40,000 r.p.m. may be reached. At some predetermined speed of rotation the magnitude of the centrifugal force becomes sufficient to overcome the friction, inertia, etc. of these components and thereafter the shaft 10 including the members mounted thereabout are longitudinally displaced in opposition to the compression spring 50 and the respective end bushing including the bearing elements contained therein are in cooperating position. Hence, as a result thereof the turbine buckets 44 are moved with respect to the inlet nozzle 45 whereby at least portions of the fluid are displaced and made ineffective to cause the rotation of the wheel. Thus the rotating turbine wheel slows down and the bias of spring 50 causes the wheel buckets again to be positioned progressively within the effective path of motive fluid. As a result thereof a balancing of the predetermined speed is obtained and thus the turbine can be maintained at a substantially steady r.p.m.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

We claim as our invention:

1. A turbine generator, comprising in combination; a driven shaft; a turbine wheel coaxially disposed about and connected to said shaft for driving rotary movement thereabout; current generator means, portions thereof rotatable in unison with said turbine wheel; an inlet nozzle mounted to said turbine generator for receiving a torque producing fluid; means responsive to said fluid causing said wheel to rotate; first means rotatably supporting said shaft and permitting progressive axial displacement thereof with respect to said fluid inlet; thrust member means for longitudinally displacing said first means in response to a predetermined rate of rotation, whereby at least portions of said fluid are presented from effectively impinging against said responsive means.

2. A turbine generator, comprising in combination, a driven shaft; a turbine wheel axially disposed about said shaft for rotary movement thereabout; a permanent magnet field rotor constructed and arranged to rotate in unison with said turbine wheel; a stator circumferentially surrounding said rotor and in combination therewith constructed and arranged to generate alternating current; a plurality of turbine buckets formed at the peripheral limits of said wheel to operably receive a motive hot gas; a hot gas inlet directing the gas into said circumferentially mounted wheel buckets; means rotatably supporting said shaft and permitting intermittent longitudinal displacement thereof with respect to said motive gas; a cup member, one end thereof providing a cone-like cup; a thrust member concentrically and rigidly mounted to said shaft and one end thereof projecting into and registering with said cup, said end providing a cone-like flange including radially arranged channels outwardly open wherein the peripheral surface thereof abuts against said cup member; a ball loosely positioned within each of said channels, said cup member restricting the path of free outward movement of said balls.

3. A turbine generator, comprising in combination; a driven shaft; a turbine wheel coaxially disposed about said shaft for rotary movement thereabout; current generator means, portions thereof rotatable in unison with said turbine wheel; an inlet nozzle mounted to said turbine generator for receiving a working fluid stream; means responsive to said fluid causing said wheel to rotate; first means rotatably supporting said shaft and permitting axial displacement thereof with respect to said fluid inlet; thrust member rigidly connected to said shaft and axially displaceable and rotatable therewith; a plurality of balls positively positioned in circular array within said thrust member; cup member means surrounding at least portions of said thrust member; means for rotatably mounting said cup member being constructed and arranged for axially displacing said first means in response to a predetermined speed of rotation whereby at least portions of said fluid stream are disengaged with respect to said responsive means.

4. A turbine generator comprising in combination, a driven shaft; a turbine wheel axially disposed about said shaft for rotary movement thereabout; an alternating current generator, at least portions thereof rotatable in unison with said turbine wheel; an inlet nozzle mounted to said turbine generator for receiving and transmitting a working fluid; means responsive to said fluid to rotate said wheel; a cup member, portions thereof providing a cone-like cup; a thrust member, having radial channels, mounted to said shaft, portions of said member projecting into and registering with said cone-like cup; weight means loosely positioned within each of said channels, first means rotatably supporting said shaft; second means mounting said shaft axially displaceable; and means to axially displace said first and second means.

5. A turbine generator, comprising in combination, a driven shaft; a turbine wheel mounted about said shaft and rotatable therewith; a magnet field rotor constructed and arranged to rotate in unison with said turbine wheel; a stator circumferentially surrounding said rotor and in combination therewith constructed and arranged to generate current; an inlet nozzle mounted to said turbine generator to receive a motive fluid; turbine buckets mounted to said wheel and responsive to said fluid; mounting means rotatably supporting said shaft and permitting axial displacement thereof with respect to said fluid nozzle; a cup member, one end thereof providing a cone-like cup; a thrust member one end coaxially and rigidly mounted to said shaft and opposite end forming a conical head, said head projecting into and registering with said cone-like cup, said head having radially arranged hollow cylindrical channels outwardly open; a plurality of balls, at least one thereof loosely positioned within each of said channels providing a centrifugal force in response to rotation of said shaft, said balls being constructed and arranged to axially displace said shaft including said mounting means; said cup member restricting the radial limit of travel of said balls.

6. In combination with a power generating unit and axially displaceable main elements thereof, a governor, comprising: a thrust member connected to one of said elements and having a conically shaped head; first means mounting said thrust member rotatably; second means mounting said thrust member axially displaceable; a cup member having a hollow conically shaped cup operably registering with said conically shaped head; means mounting said cup member rotatably; a plurality of balls movably positioned in circular array within said conically shaped head and being constructed and arranged to axially displace said thrust member in response to rotation of said main elements.

7. The combination as described in claim 6, wherein said conically shaped head forms a plurality of hollow cylindrical radially arranged channels to freely position said balls therein; and said conical cup having a conical configuration with an included angle of not more than 15°.

8. A turbo generator, comprising in combination, a hollow housing encasing said turbo generator; a driven shaft; a turbine wheel mounted about said shaft for rotary movement therewith; a heat shielding means surrounding at least portions of said wheel; a rotor constructed and arranged to rotate in unison with said turbine wheel; a stator circumferentially surrounding said rotor and in combination therewith constructed and arranged to generate current; a plurality of turbine buckets formed at the peripheral limits of said wheel to operably receive a torque producing fluid; a fluid inlet and outlet means mounted to said housing; a first substantially cylindrical bushing slidably disposed within said housing and coaxially mounted to one end of said shaft, said bushing having a first and second axial cavity; a bearing element peripherally rigidly disposed within said first cavity adjacent to said wheel to journal said shaft therein; a second substantially hollow cylindrical bushing axially and slidably positioned within said housing and mounted coaxially to another end of said shaft; bearing means having a central opening and receiving said shaft therethrough and being peripherally rigidly disposed within said second bushing adjacent to said rotor; a spring partially disposed within said second cavity; adjustable thrust bearing means mounted to said housing and engaging said spring; a cup member, one end thereof providing a conical housing; a thrust member having a plurality of hollow cylindrical channels and being coaxially and rigidly mounted to said shaft; said conical housing projecting into and registering with portions of said thrust member; centrifugal weight means movably positioned within each of said channels; and said conical housing restricting the free movement of said weights.

9. A turbo generator, comprising in combination, a hollow housing encasing said turbo generator; a driven shaft; a turbine wheel mounted about said shaft for rotary movement therewith; a heat shielding means surrounding at least portions of said wheel; a rotor constructed and arranged to rotate in unison with said turbine wheel; a stator circumferentially surrounding said rotor and in combination therewith constructed and arranged to generate current; a plurality of turbine buckets formed at the peripheral limits of said wheel to operably receive a torque producing fluid; a fluid inlet and outlet means mounted to said housing; a first substantially cylindrical bushing slidably disposed within said housing and coaxially mounted to one end of said shaft, said bushing having a first and second axial cavity; a bearing element peripherally rigidly disposed within said first cavity adjacent to said wheel to journal said shaft therein; a second substantially hollow cylindrical bushing axially and slidably positioned within said housing and mounted coaxially to another end of said shaft; bearing means having a central opening and receiving said shaft therethrough and being peripherally rigidly disposed within said second bushing adjacent to said rotor; a spring partially disposed within said second cavity; adjustable thrust bearing means mounted to said housing and engaging said spring; centrifugal governor means constructed and arranged within said housing to axially displace said shaft, said rotor and turbine wheel mounted to said shaft, and said first and second bushing.

References Cited in the file of this patent

UNITED STATES PATENTS

| | | |
|---|---|---|
| 1,167,018 | Pyle | Jan. 4, 1916 |
| 1,397,086 | Dake | Nov. 15, 1921 |
| 1,420,076 | Bouche et al. | June 20, 1922 |
| 1,446,787 | Dake | Feb. 27, 1923 |
| 1,506,111 | Crozet-Fourneyron | Aug. 26, 1924 |
| 1,586,203 | Kiester | May 25, 1926 |
| 1,645,411 | Blake | Oct. 11, 1927 |
| 1,976,598 | Boothby et al. | Oct. 9, 1934 |
| 2,338,718 | Hathaway | Jan. 11, 1944 |
| 2,402,972 | Mitchell | July 2, 1946 |
| 2,635,596 | Adler | Apr. 21, 1953 |